(12) United States Patent
Matsuoka

(10) Patent No.: US 10,724,600 B2
(45) Date of Patent: Jul. 28, 2020

(54) DYNAMIC VIBRATION ABSORBER

(71) Applicant: EXEDY Corporation, Neyagawa-shi, Osaka (JP)

(72) Inventor: Yoshihiro Matsuoka, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 66 days.

(21) Appl. No.: 16/270,118

(22) Filed: Feb. 7, 2019

(65) Prior Publication Data
US 2019/0277366 A1 Sep. 12, 2019

(30) Foreign Application Priority Data
Mar. 12, 2018 (JP) .................. 2018-044245

(51) Int. Cl.
| | |
|---|---|
| H02K 11/30 | (2016.01) |
| H02K 7/02 | (2006.01) |
| F16F 15/12 | (2006.01) |
| F16D 3/12 | (2006.01) |
| F16H 45/02 | (2006.01) |
| F16F 15/14 | (2006.01) |

(52) U.S. Cl.
CPC ............ *F16F 15/1202* (2013.01); *F16D 3/12* (2013.01); *H02K 7/02* (2013.01); *H02K 11/30* (2016.01); *F16D 2300/22* (2013.01); *F16F 15/1421* (2013.01); *F16F 2222/08* (2013.01); *F16F 2228/066* (2013.01); *F16F 2232/02* (2013.01); *F16H 45/02* (2013.01); *F16H 2045/0226* (2013.01); *F16H 2045/0294* (2013.01)

(58) Field of Classification Search
CPC ................................ H02K 7/02; H02K 11/30
USPC ........................................ 310/75 R, 76, 78
See application file for complete search history.

(56) References Cited

U.S. PATENT DOCUMENTS

| | | | |
|---|---|---|---|
| 6,019,683 A * | 2/2000 | Sudau | F16F 15/13157 192/212 |
| 6,119,840 A * | 9/2000 | Dettmar | F16F 15/134 192/70.17 |
| 2004/0188216 A1* | 9/2004 | Yamazaki | F16D 25/0638 192/84.6 |

(Continued)

FOREIGN PATENT DOCUMENTS

| | | |
|---|---|---|
| JP | 2017-524109 A1 | 8/2017 |
| WO | 2016/023795 A1 | 2/2016 |

*Primary Examiner* — Jose A Gonzalez Quinones
(74) *Attorney, Agent, or Firm* — United IP Counselors, LLC

(57) ABSTRACT

A dynamic vibration absorber is disclosed. The dynamic vibration absorber includes a rotatable first hub, an inertia member, a plurality of elastic members, a plurality of sliders, and a guide member. The inertia member is disposed on an outer peripheral side of the first hub. The inertia member is rotatable relative to the first hub. The plurality of elastic members radially extend between the first hub and the inertia member. The plurality of elastic members are elastically deformable and elastically couple the first hub and the inertia member in a rotational direction. The plurality of sliders are radially movable along the plurality of elastic members. The plurality of sliders are configured to contact the plurality of elastic members. The guide member radially move the plurality of sliders. The guide member determines radial positions of the plurality of sliders.

14 Claims, 5 Drawing Sheets

(56) References Cited

U.S. PATENT DOCUMENTS

2017/0072936 A1\* 3/2017 Inagawa ............... F16F 15/134
2017/0292586 A1 10/2017 Orlamunder et al.

\* cited by examiner

DYNAMIC VIBRATION ABSORBER

CROSS-REFERENCE TO RELATED APPLICATIONS

This application claims priority to Japanese Patent Application No. 2018-044245, filed Mar. 12, 2018. The contents of that application are incorporated by reference herein in their entirety.

TECHNICAL FIELD

The present invention relates to a dynamic vibration absorber.

BACKGROUND ART

There is a type of vehicle provided with such a rotational vibration attenuating device (dynamic vibration absorber) as described in Japan Laid-open Patent Application Publication No. 2017-524109 on a power transmission path so as to attenuate rotational vibration occurring due to fluctuation in torque from an engine or so forth.

The rotational vibration attenuating device, described in Japan Laid-open Patent Application Publication No. 2017-524109, includes a carrier to which power is inputted, an absorber mass (inertia member) rotatable relative to the carrier, and a plurality of absorber springs (elastic members). The plural absorber springs are elastic members elastically coupling the carrier and the absorber mass in a rotational direction. The plural absorber springs are composed of a plurality of pairs of flat springs disposed in opposition. Additionally, a plurality of sliders are provided such that each is interposed between each pair of flat springs.

In this device, the sliders are radially moved by centrifugal forces, whereby fulcrums in elastic deformation of the flat springs are shifted. In other words, the flat springs are changed in bending stiffness. Because of this, torsional stiffness for attenuating rotational vibration (i.e., torsional characteristics or vibration attenuating characteristics) is changed in accordance with rotational speed.

In the device described in Japan Laid-open Patent Application Publication No. 2017-524109, the torsional stiffness of the device can be changed in accordance with the centrifugal forces (i.e., rotational speed).

Now, there has been proposed a vehicle equipped with a cylinder deactivation system as a type of engine installed vehicle. In the cylinder deactivation system, part or entirety of cylinders are deactivated in low load operation or idling operation. It is desirable for the vehicle equipped with the cylinder deactivation system herein described to meet a demand of making characteristics for attenuating rotational vibration changeable in accordance with change in number of cylinders to be activated.

However, the device described in Japan Laid-open Patent Application Publication No. 2017-524109 cannot cope with the demand described above. Additionally, it is difficult to accurately regulate relation between change in stiffness of each flat spring caused by shifting of the fulcrum thereof and displacement of each slider moved by a centrifugal force.

BRIEF SUMMARY

It is an object of the present advancement to make vibration attenuating characteristics changeable without depending on rotational speed. Besides, it is another object of the present advancement to make vibration attenuating characteristics easily regulatable such that required characteristics are obtainable even when fluctuation occurs in either or both of the stiffness of an elastic member and the amount of inertia of an inertia member, both of which determine the vibration attenuating characteristics.

(1) A dynamic vibration absorber according to the present advancement includes a first hub rotated, an inertia member, a plurality of elastic members, a plurality of sliders and a guide member. The inertia member is disposed on an outer peripheral side of the first hub so as to be rotatable relative to the first hub. The plurality of elastic members radially extend between the first hub and the inertia member while being elastically deformable in a rotational direction. The plurality of elastic members elastically couple the first hub and the inertia member in the rotational direction. The plurality of sliders are radially movable along the plurality of elastic members, and are capable of making contact with the plurality of elastic members. The guide member radially moves the plurality of sliders and determines radial positions of the plurality of sliders.

In the present device, when the first hub is rotated, the inertia member coupled thereto by the elastic members is also rotated similarly to the first hub. At this time, when rotational vibration attributed to fluctuation in torque exists in the first hub, the rotational vibration is attenuated by the inertia member. Vibration attenuating characteristics are determined by the amount of inertia of the inertia member and the stiffness of the elastic members.

The sliders herein make contact with the elastic members, and fulcrums in elastic deformation of the elastic members change in accordance with the contact sites. This results in change in stiffness of the elastic members. The sliders are moved by the guide member, and the radial positions thereof are determined by the guide member. Therefore, the stiffness of the elastic members, i.e., the vibration attenuating characteristics can be regulated by controlling the radial positions of the sliders with use of the guide member.

The vibration attenuating characteristics can be herein regulated by the guide member. Hence, the vibration attenuating characteristics can be obtained without depending on the rotational speed. Because of this, appropriate vibration attenuating characteristics can be obtained when the present advancement is applied to, for instance, a vehicle equipped with a cylinder deactivation system. Additionally, even when fluctuation occurs in the amount of inertia of the inertia member and the stiffness of the elastic members, desired vibration attenuating characteristics can be obtained by adjusting the radial positions of the sliders with use of the guide member.

(2) Preferably, the guide member is rotatable, and the plurality of sliders are radially moved by rotation of the guide member.

The sliders can be herein radially moved by rotating the guide member. Therefore, a mechanism for moving the sliders is made simple.

(3) Preferably, the guide member includes a plurality of spiral grooves. The plurality of sliders are radially movable while being supported by the plurality of spiral grooves.

The guide member is herein provided with the spiral grooves. Hence, the sliders can be radially moved by rotating the guide member. Therefore, the mechanism for moving the sliders is simplified (4) Preferably, the guide member includes a pair of guide plates. The pair of guide plates is disposed in axial opposition to each other while the plurality of elastic members are interposed therebetween. The pair of guide plates is provided with the plurality of spiral grooves. The plurality of sliders are movably supported at both axial ends thereof by the plurality of spiral grooves of the pair of guide plates.

The sliders are herein moved, while being supported at the both ends thereof by the spiral grooves of the pair of guide plates. Therefore, the sliders can be stably moved.

(5) Preferably, the plurality of elastic members include a plurality of pairs of elastic members, and each of the plurality of pairs of elastic members is disposed in parallel with each other. Additionally, each of the plurality of sliders is disposed between the each of the plurality of pairs of elastic members.

Each slider is herein radially moved between each pair of elastic members. The radial position of each slider is determined by the guide member. In elastic deformation, one of each pair of elastic members is elastically deformed at a contact site with each slider as a fulcrum.

(6) Preferably, the plurality of elastic members each have a straight shape at least in a moving range of the plurality of sliders. This enables smooth movement of each slider.

(7) Preferably, the plurality of sliders are a plurality of pins. This makes the configuration of each slider simple.

(8) Preferably, the plurality of elastic members are each fixed at an inner peripheral end thereof to the first hub so as to be immovable with respect thereto while being each supported at an outer peripheral end thereof by the inertia member so as to be radially movable with respect thereto.

Each elastic member receives a torque from the first hub through a part thereof fixed to the first hub, and is elastically deformed at a part thereof making contact with each slider as the fulcrum. The torque of the first hub acts on the inertia member through each elastic member.

When herein elastically deformed, each elastic member is changed in radial length. In view of this, each elastic member is configured to be radially movable with respect to the inertia member at one end thereof, i.e., an end thereof supported by the inertia member disposed on the outer peripheral side.

(9) Preferably, the dynamic vibration absorber further includes a second hub to which the guide member is fixed and that is disposed on an inner peripheral side of the first hub so as to be rotatable relative to the first hub.

(10) Preferably, the first hub includes a permanent magnet that includes N and S poles alternately disposed in a circumferential direction. The second hub includes an electromagnet that includes a coil to which electric current is supplied.

Here, the first hub and the second hub compose a motor. Therefore, the second hub can be rotated with respect to the first hub by supplying electric current to the coil of the second hub. The guide member is fixed to the second hub. Hence, the guide member is rotated by rotation of the second hub, whereby the sliders can be radially moved.

(11) Preferably, the dynamic vibration absorber further includes a boss member that is disposed on the inner peripheral side of the second hub and radially supports the second hub. The boss member includes at least one of a controller and a battery. The controller controls the electric current supplied to the coil of the second hub. The battery supplies the electric current to the coil of the second hub.

The electric current is herein supplied to the coil of the second hub from the battery through the controller. At least one of the battery and the controller is provided in the boss member supporting the second hub. Hence, the present device can be made compact.

(12) The dynamic vibration absorber further includes a first plate and a second plate. The first plate is fixed to the first hub, and is disposed in axial opposition to the plurality of elastic members. The second plate is fixed to the first hub, and is disposed in axial opposition to the first plate while the plurality of elastic members are interposed therebetween.

(13) Preferably, the dynamic vibration absorber further includes a stopper mechanism for restricting a relative torsion angle between the inertia member and one of the first and second plates to a predetermined angular range.

(14) Preferably, the first plate includes a plurality of first grooves radially extending, while the second plate includes a plurality of second grooves radially extending. The plurality of first grooves and the plurality of second grooves are provided in circumferentially identical positions. The plurality of sliders are movable at the both axial ends thereof along the plurality of first grooves and the plurality of second grooves.

Overall, according to the present advancement described above, vibration attenuating characteristics are made changeable in a dynamic vibration absorber without depending on rotational speed. Besides, according to the present advancement, vibration attenuating characteristics are made easily regulatable such that desired characteristics are easily obtainable even when fluctuation occurs in either or both of the stiffness of an elastic member and the amount of inertia of an inertia member.

DETAILED DESCRIPTION

Figure 1:
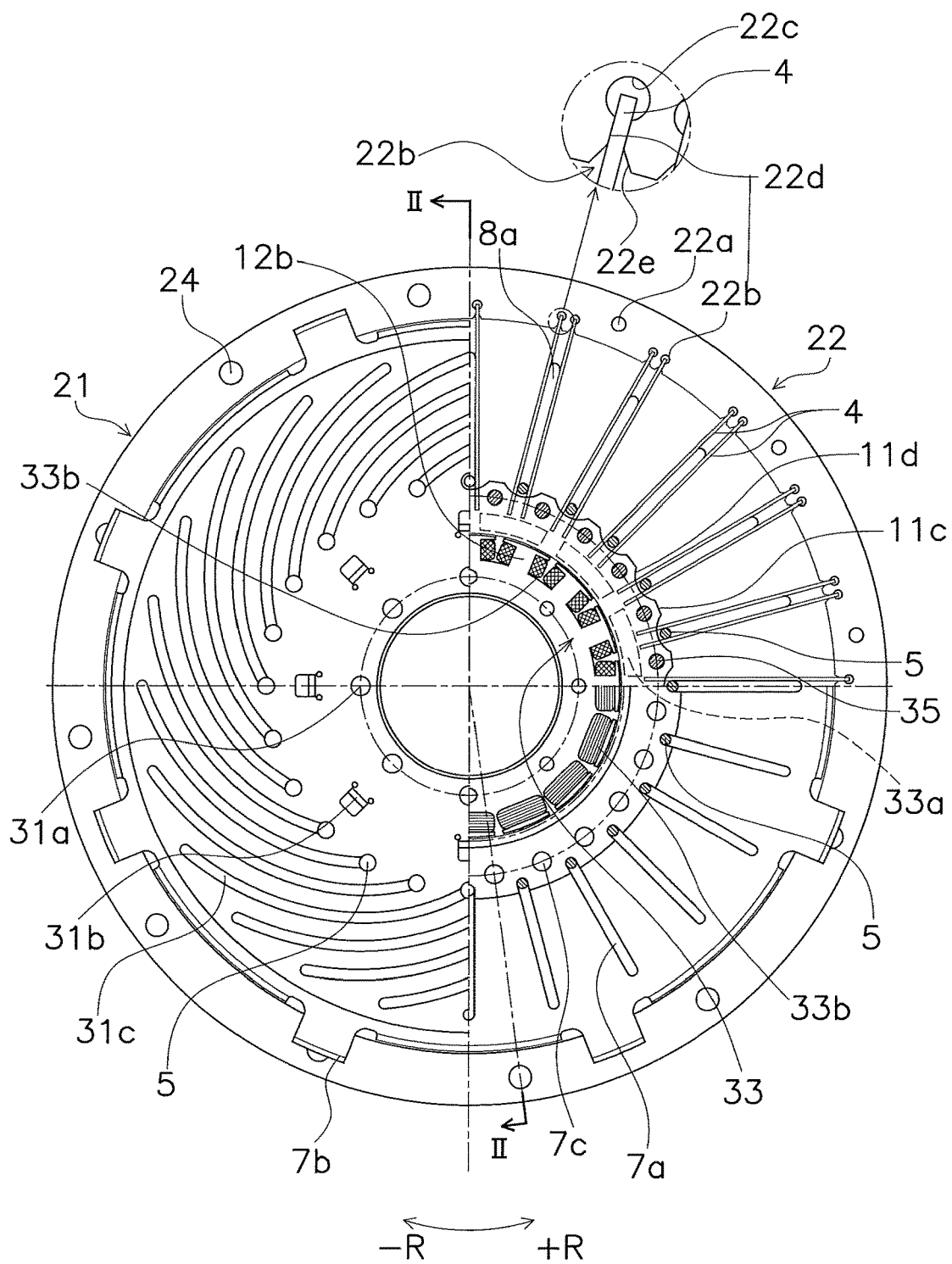
FIG. 1 is a front view of a dynamic vibration absorber according to a preferred embodiment of the present disclosure.
Figure 2:
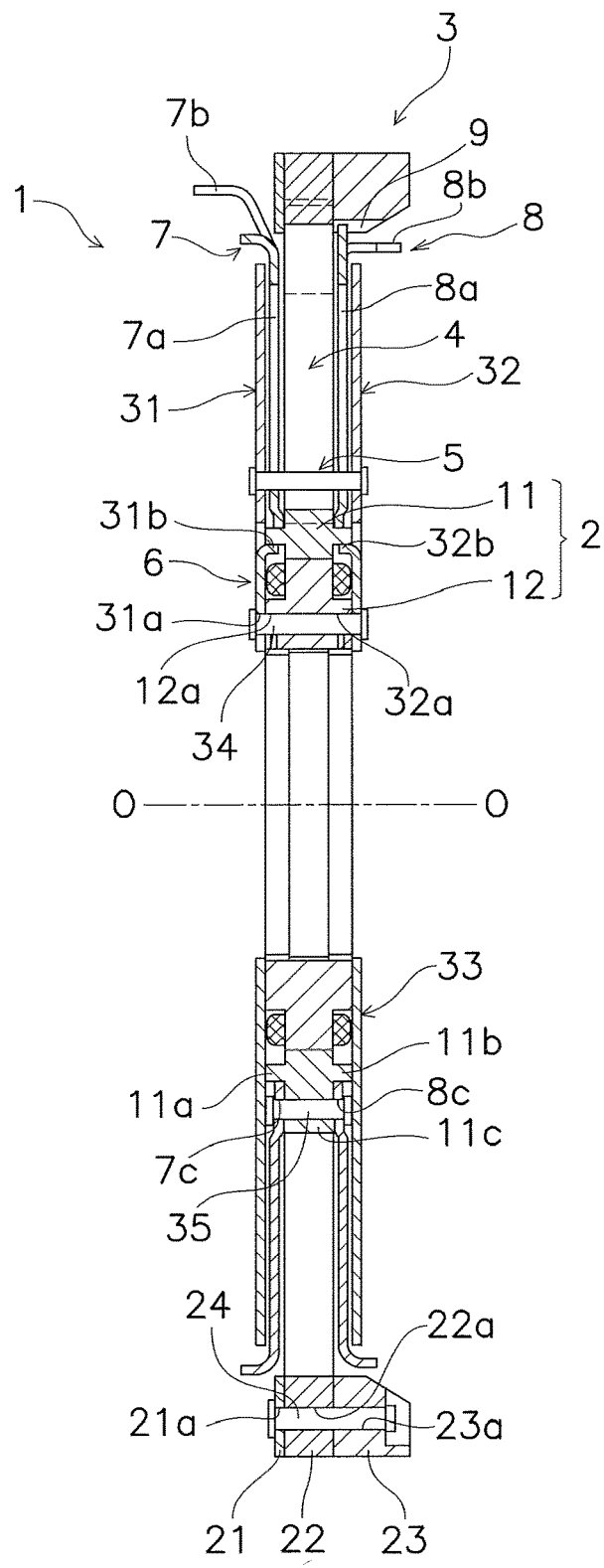
FIG. 2 is a cross-sectional view of FIG. 1 taken along line II-II.

FIGS. 1 and 2 show a dynamic vibration absorber 1 according to a preferred embodiment of the present disclosure. FIG. 1 is a front view of the dynamic vibration absorber 1, whereas FIG. 2 is a cross-sectional view of FIG. 1 taken along line II-II. It should be noted that part of FIG. 1 is shown while some member or members is detached therefrom for convenience of explanation. Additionally in FIG. 2, line O-O indicates the center of a rotational shaft.

[Entire Configuration]

The dynamic vibration absorber 1 includes a hub 2, an inertia member 3, a plurality of flat springs 4 (exemplary elastic member), a plurality of slider pins 5 and a drive guide mechanism 6 that drives and guides the slider pins 5. Additionally, the dynamic vibration absorber 1 includes a first plate 7, a second plate 8 and a stopper mechanism 9.

[Hub 2]

The hub 2 is disposed in the inner peripheral part of the dynamic vibration absorber 1. The hub 2 includes a first hub 11 and a second hub 12, both of which are rotatable about the rotational shaft.

The first hub 11 has an annular shape and includes annular protruding portions 11a and 11b on a radially intermediate part thereof. The annular protruding portions 11a and 11b protrude therefrom to the both axial sides. Additionally, as is obvious from FIG. 1, the first hub 11 includes a plurality of protruding portions 11c and a plurality of recessed portions 11d on the outer peripheral surface thereof. The protruding portions 11c protrude to the outer peripheral side. The recessed portions 11d are provided such that each is interposed between adjacent two of the protruding portions 11c. The outer peripheral surface of each recessed portion 11d is made in the shape of a curved surface curved to be recessed to the inner peripheral side.

The second hub 12 is disposed on the inner peripheral side of the first hub 11, and is rotatable relative to the first hub 11. The second hub 12 is provided with a plurality of fixation holes 12a in the inner peripheral part thereof. The fixation holes 12a axially penetrate therethrough. It should be noted that the second hub 12 composes a motor together with the first hub 11. The configuration of the motor will be described below.

[Inertia Member 3]

The inertia member 3 is disposed on the outer peripheral side of the first hub 11, and is rotatable relative to the first hub 11. The inertia member 3 includes a first inertia ring 21, a second inertia ring 22 and a third inertia ring 23, each of which has an annular shape.

The first inertia ring 21 is a plate member disposed as a one axial end-side ring. The first inertia ring 21 includes a plurality of coupling holes 21a that axially penetrate therethrough and are circumferentially aligned at equal intervals.

The thickness (axial length) of the second inertia ring 22 is greater than the thickness of the first inertia ring 21 and is equal to the width (axial length) of each flat spring 4. One lateral surface of the second inertia ring 22 makes contact with that of the first inertia ring 21. The second inertia ring 22 includes a plurality of coupling holes 22a that axially penetrate therethrough and are circumferentially aligned at equal intervals. The coupling holes 22a are provided in identical positions to the coupling holes 21a of the first inertia ring 21.

Additionally, the second inertia ring 22 includes a plurality of support grooves 22b on the inner peripheral side of the coupling holes 22a. The support grooves 22b axially penetrate therethrough. As shown in FIG. 1, the plural support grooves 22b are composed in a plurality of pairs. Each pair of support grooves 22b is disposed circumferentially close to each other.

As shown close-up in FIG. 1, each support groove 22b includes a circular portion 22c provided in the outer peripheral part thereof, a support portion 22d and an inner peripheral end 22e. The support portion 22d extends straight from the circular portion 22c to the inner peripheral side. The distal end of each flat spring 4 is inserted into the support portion 22d, and the width of the support portion 22d is approximately equal to the thickness of each flat spring 4. The inner peripheral end 22e is provided on the inner peripheral side of the support portion 22d, and is shaped such that the groove width thereof is widened inward from the support portion 22d.

The third inertia ring 23 is shaped to have a thickness (axial length) further greater than that of the second inertia ring 22. The third inertia ring 23 is disposed to interpose the second inertia ring 22 together with the first inertia ring 21 therebetween. The third inertia ring 23 includes a plurality of coupling holes 23a that axially penetrate therethrough and are circumferentially aligned at equal intervals. The coupling holes 23a are provided in identical positions to pairs of coupling holes 21a and 22a of the first and second inertia rings 21 and 22, respectively. A plurality of triads of coupling holes 21a, 22a and 23a are penetrated by a plurality of rivets 24, respectively, whereby the first to third inertia rings 21 to 23 are fixed to each other.

[Flat Springs 4]

The flat springs 4 radially extend between the first hub 11 and the second inertia ring 22. As described above, the width (axial length) of each flat spring 4 is equal to the thickness (axial length) of the second inertia ring 22. Each flat spring 4 is fixed at the inner peripheral end thereof to the first hub 11, while being supported at the outer peripheral end thereof by each support groove 22b of the second inertia ring 22 (detailedly, the support portion 22d). In other words, each flat spring 4 is supported at the outer peripheral end thereof while being radially movable with respect to the second inertia ring 22 but non-rotatable relative thereto. Each flat spring 4 is elastically deformable and elastically couples the first hub 11 and the inertia member 3 including the second inertia ring 22 in a rotational direction.

It should be noted that the plural flat springs 4 are supported by the support grooves 22b of the second inertia ring 22, respectively. Hence, this means that the plural flat springs 4 include a plurality of pairs of flat springs 4, and each pair of flat springs 4 is disposed in parallel with each other.

[Slider Pins 5]

Each slider pin 5 has a columnar shape and is disposed between each pair of flat springs 4 so as to be radially movable. In other words, each slider pin 5 is radially movable along each pair of flat springs 4, and is capable of making contact with one of each pair of flat springs 4.

[Drive Guide Mechanism 6]

The drive guide mechanism 6 is a mechanism that radially moves the slider pins 5 and determines the radial positions of the slider pins 5. The expression "determines the radial positions (of the slider pins 5)" herein means stopping the slider pins 5 in given radial positions and then holding the slider pins 5 on the spot.

The drive guide mechanism 6 includes a pair of first and second guide plates 31 and 32 and a motor 33 rotating the pair of guide plates 31 and 32.

The pair of first and second guide plates 31 and 32 is disposed in opposition to each other so as to axially interpose the flat springs 4 therebetween. Each of the first and second guide plates 31 and 32 has a disc shape and includes a plurality of fixation holes 31a, 32a, a plurality of axis alignment pawls 31b, 32b and a plurality of spiral grooves 31c, 32c. The fixation holes 31a, 32, the axis alignment pawls 31b, 32b and the spiral grooves 31c, 32c are disposed sequentially in this order from the inner peripheral side. It should be noted that the spiral grooves 32c of the second guide plate 32, although not shown in the drawings, are disposed in identical positions to the spiral grooves 31c of the second guide plate 32 and have the same shapes as the spiral grooves 31c.

A plurality of pairs of fixation holes 31a and 32a are provided in identical positions to the fixation holes 12a of the second hub 12. A plurality of triads of fixation holes 31a, 32a and 12a are penetrated by a plurality of rivets 34, respectively, whereby the pair of first and second guide plates 31 and 32 is fixed to the second hub 12.

The axis alignment pawls 31b, 32b are formed by bending part of each of the first and second guide plates 31 and 32 axially inward. Additionally, the axis alignment pawls 31b, 32b make contact at the outer peripheral surfaces thereof with the inner peripheral surface of each annular protruding portion 11a, 11b of the first hub 11. In other words, the first hub 11 is radially positioned with respect to the second hub 12 and the first and second guide plates 31 and 32 by the contact between the axis alignment pawls 31b, 32b and each annular protruding portion 11a, 11b.

The spiral grooves 31c, 32c extend from positions located on the outer peripheral side of the axis alignment pawls 31b, 32b to the outer peripheral end of each of the first and second guide plates 31 and 32. In FIG. 1, the spiral grooves 31c, 32c are made in the shape of spirals rotating clockwise from the inner peripheral side to the outer peripheral side. Each slider pin 5 is movably supported at the both ends thereof by each pair of spiral grooves 31c and 32c. Therefore, when the first and second guide plates 31 and 32 are rotated, each slider pin 5 is radially movable while being guided by each pair of spiral grooves 31c and 32c.

The motor 33 includes a permanent magnet 33a and a coil 33b. The permanent magnet 33a is provided in the inner peripheral end of the first hub 11, whereas the coil 33b is provided in the second hub 12. The permanent magnet 33a is composed of N and S poles alternately disposed in the circumferential direction. The second hub 12 is provided with a plurality of teeth 12b on the outer peripheral part thereof. The coil 33b is wound about the teeth 12b. Therefore, the second hub 12 functions as an electromagnet when electric current is supplied to the coil 33b provided thereon. Besides, the second hub 12 becomes rotatable with respect to the first hub 11 when electric current is supplied to the coil 33b provided thereon.

[First and Second Plates 7 and 8]

The first plate 7 is disposed axially between the first guide plate 31 and the flat springs 4. The second plate 8 is disposed axially between the second guide plate 32 and the flat springs 4. Each of the first and second plates 7 and 8 has a disc shape and is provided with holes 7c, 8c in the inner peripheral end thereof. A plurality of pairs of holes 7c and 8c are penetrated by a plurality of rivets 35, respectively, whereby the first and second plates 7 and 8 are fixed to each other while being axially immovable with respect to the first hub 11 and non-rotatable relative thereto.

Each of the first and second plates 7 and 8 includes a plurality of guide grooves 7a, 8a and a plurality of engaging portions 7b, 8b.

The guide grooves 7a, 8a are radially provided from the inner peripheral end to the outer peripheral end in each of the first and second plates 7 and 8. Each slider pin 5 is supported at the both ends thereof by the first and second plates 31 and 32, while passing through each pair of guide grooves 7a and 8a. As described above, when the first and second guide plates 31 and 32 are rotated, each slider pin 5 is radially moved along each pair of spiral grooves 31c and 32c. At this time, each slider pin 5 is moved within each pair of guide grooves 7a and 8a.

The engaging portions 7b, 8b protrude from the outer peripheral part of each plate 7, 8 to the further outer peripheral side, and the distal ends thereof are bent axially outward. These engaging portions 7b and 8b function to transmit a torque to the dynamic vibration absorber 1.

[Stopper Mechanism 9]

Figure 3:
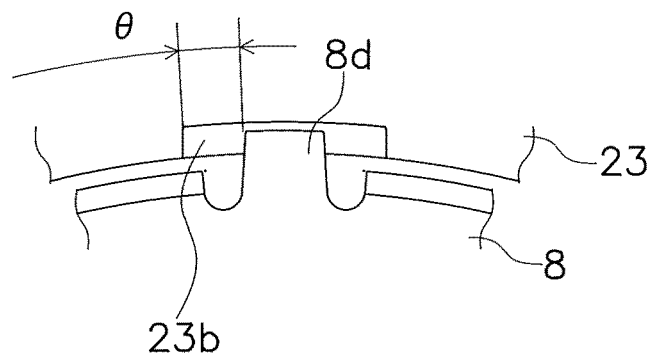
FIG. 3 is a front view of a stopper mechanism.

As described above, the first hub 11 and the inertia member 3 are rotatable relative to each other. Because of this, the stopper mechanism 9 is provided for preventing the first hub 11 and the inertia member 3 from being displaced from each other at a predetermined torsion angle or greater. As shown in FIG. 3, the stopper mechanism 9 includes a plurality of grooves 23b and a plurality of stopper pawls 8d. The grooves 23b are provided on the third inertia ring 23, whereas the stopper pawls 8d are provided on the second plate 8.

The grooves 23b are provided on the inner peripheral surface of the third inertia ring 23, and each has a predetermined circumferential length. The stopper pawls 8d are shaped to protrude from the outer peripheral surface of the second plate 8 to the further outer peripheral side. The stopper pawls 8da re inserted at the distal ends thereof into the grooves 23b, respectively, and each has a shorter circumferential length than each groove 23b. Therefore, the relative torsion angle between the second plate 8 and the third inertia ring 23 is not greater than an angle θ shown in FIG. 3. It should be noted that FIG. 3 shows a state that the torsion angle between the first hub 11 (i.e., the second plate 8) and the inertia member 3 is "0".

In the configuration described above, the relative torsion angle between the first hub 11 and the inertia member 3 becomes θ when maximized. Because of this, elastic deformation of each flat spring 4 is restricted to a predetermined amount.

[Action]

In the dynamic vibration absorber 1 described above, a torque is inputted to one of the first and second plates 7 and 8, and is then outputted from the other of the first and second plates 7 and 8. For example, the engaging portions 7b of the first plate 7 are engaged with an engine-side member, and the torque is inputted to the first plate 7 through the engaging portions 7b. The torque is transmitted to the first hub 11. On the other hand, the engaging portions 8b of the second plate 8 is engaged with a transmission-side member, and the torque transmitted to the first hub 11 is transmitted to the transmission-side member through the second plate 8.

Figure 4A:
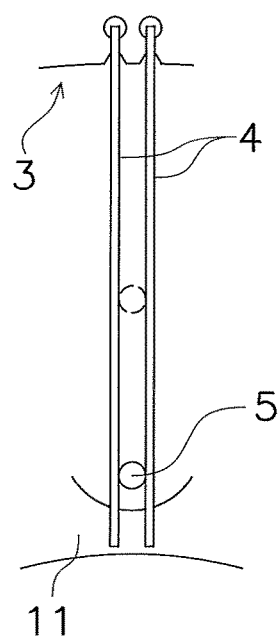
FIGS. 4A-4C are diagrams for explaining an action of flat springs.

When the inputted torque does not herein fluctuate, the first hub 11 and the inertia member 3 are rotated in synchronization with each other anytime except for starting. Therefore, as shown FIG. 4A, each pair of flat springs 4 does not elastically deform.

By contrast, when the inputted torque fluctuates, the inertia member 3 is displaced from the first hub 11 in both +R and −R directions shown in FIG. 1. In other words, the inertia member 3 is rotated relative to the first hub 11. In this case, one of each pair of flat springs 4 is supposed to elastically deform.

One of each pair of flat springs 4, fixed to the first hub 11 at the inner peripheral part thereof (functioning as an effort), herein receives a torque from the first hub 11, is elastically deformed at each slider pin 5 functioning as a fulcrum, and exerts the torque on the inertia member 3 at the outer peripheral end thereof (specifically, while each support portion 22d functions as a load). Therefore, by changing the radial position of each slider pin 5 functioning as the fulcrum, the torque inputted to the inner peripheral part of one of each pair of flat springs 4 can be changed in magnitude when acting on the inertia member 3. In other words, by changing the radial position of each slider pin 5, one of each flat spring 4 is supposed to be changed in stiffness.

Figure 4B:
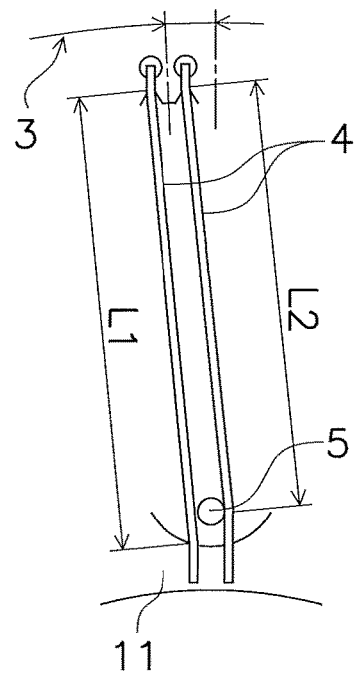

Therefore, when it is intended to obtain a torsional characteristic with low stiffness, each slider pin 5 is located in a relatively inner peripheral position as shown in FIG. 4B. In other words, distance between the fulcrum (the contact point between each slider pin 5 and one of each pair of flat springs 4) and the load (the contact point between each support portion 22d of the second inertia ring 22 and one of each pair of flat springs 4) is set to be relatively long as L2. Accordingly, one of each pair of flat springs 4 is degraded in stiffness, whereby the device can obtain a torsional characteristic with low stiffness as a whole.

By contrast, when it is intended to obtain a torsional characteristic with high stiffness, the second hub 12 and the first and second guide plates 31 and 32 are rotated in the +R direction shown in FIG. 1 by rotating the motor 33. Accordingly, each slider pin 5, supported by each pair of spiral grooves 31c and 32c, is moved radially outward while being guided by each pair of spiral grooves 31c and 32c herein rotated. At this time, each slider pin 5 is moved within each pair of the guide grooves 7a and 8a of the first and second plates 7 and 8.

Figure 4C:
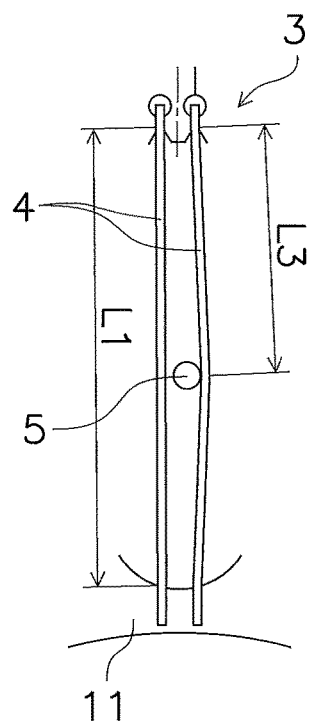

When rotation of the first and second guide plates 31 and 32 is then stopped by stopping the motor 33, each slider pin 5 is stopped on the spot and is held in, for instance, a position shown in FIG. 4C. In this state, the position of each slider pin 5 is moved to the outer peripheral side of that in FIG. 4A. In other words, the distance between the fulcrum and the load is set to be relatively short as L3. Accordingly, one of each pair of flat springs 4 is enhanced in stiffness, whereby the device can obtain a torsional characteristic with high stiffness as a whole.

EMBODIMENTS

(1) First Embodiment

Figure 5:
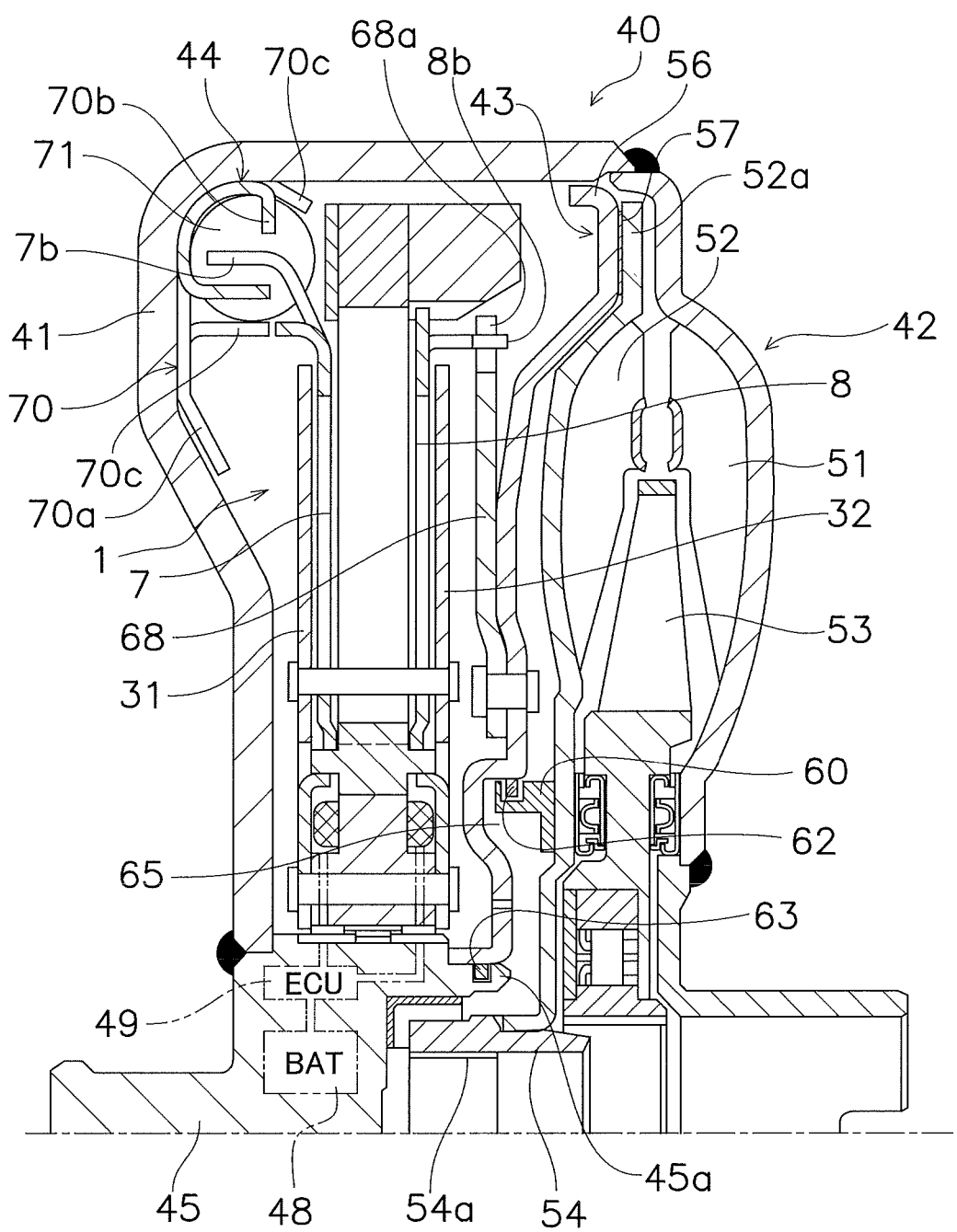
FIG. 5 is a cross-sectional view of a torque converter in a first embodiment of the dynamic vibration absorber.
Figure 6:
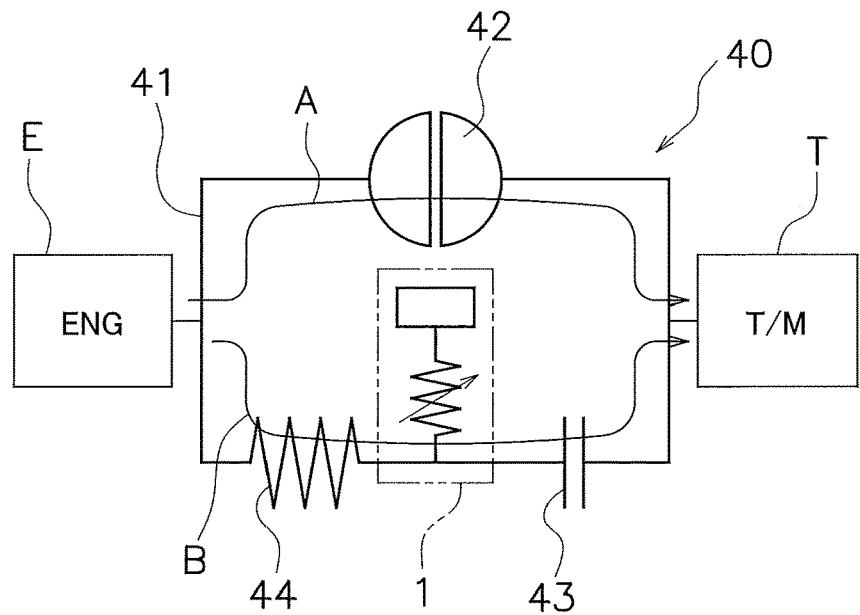
FIG. 6 is a block diagram showing the first embodiment of the dynamic vibration absorber.

FIG. 5 shows the first embodiment in which the dynamic vibration absorber 1 according to the preferred embodiment of the present invention is applied to a torque converter 40. FIG. 6 is a block diagram of a vehicle equipped with the torque converter 40 shown in FIG. 5. As shown in FIG. 6, the torque converter 40 is disposed between an engine E and a transmission T.

The torque converter 40 includes a front cover 41 coupled to an engine-side member, a torque converter body 42, a lock-up device 43, a damper mechanism 44 and the dynamic vibration absorber 1. The dynamic vibration absorber 1 is the dynamic vibration absorber shown in FIGS. 1 to 4.

A boss member 45 is fixed to the inner peripheral part of the front cover 41. The boss member 45 supports the second hub 12 such that the second hub 12 is rotatable. A drive plate (not shown in the drawings), for instance, is coupled to the front cover 41, and a torque from the engine E is inputted to the front cover 41 through the drive plate. The boss member 45 is embedded with a battery 48 and a control circuit (ECU) 49. The battery 48 supplies electric current to the coil 33b of the dynamic vibration absorber 1. The control circuit 49 is disposed between the battery 48 and the coil 33b, and controls the electric current supplied to the coil 33b from the battery 48.

The torque converter body 42 has a heretofore known configuration and includes an impeller 51, a turbine 52 and a stator 53. The impeller 51 is connected at the outer peripheral part thereof to the front cover 41. Additionally, the turbine 52 is fixed at the inner peripheral part thereof to a turbine hub 54. The turbine hub 54 is provided with a spline hole 54a on the inner peripheral surface thereof. The spline hole 54a is coupled to an input shaft (not shown in the drawings) of the transmission T.

The lock-up device 43 includes a piston 56 disposed on the front cover 41 side of the turbine 52. The piston 56 has a disc shape and is provided with an annular friction member 57 fixed to the lateral surface of the outer peripheral part thereof. The annular friction member 57 is pressed onto a friction portion 52a provided in the outer peripheral part of the turbine 52. The piston 56 is axially slidable with respect to both a cylinder 60 fixed to the inner peripheral part of the turbine 52 and a tubular portion 45a of the boss member 45.

A seal member 62 is provided between the piston 56 and the cylinder 60, whereas a seal member 63 is provided between the piston 56 and the tubular portion 45a of the boss member 45. Accordingly, an oil chamber 65 is formed on the inner peripheral side of the cylinder 60. The piston 56 is axially actuated by controlling the pressure of hydraulic oil residing in the interior of the oil chamber 65.

Additionally, the piston 56 is provided with a coupling member 68 on the front cover 41-side lateral surface thereof. The coupling member 68 is fixed at the inner peripheral part thereof to the piston 56, and includes a plurality of engaging grooves 68a in the outer peripheral part thereof.

The damper mechanism 44 is disposed axially between the front cover 41 and the dynamic vibration absorber 1. The damper mechanism 44 includes an input member 70 and a plurality of coil springs 71.

The input member 70 includes a fixation portion 70a, an engaging portion 70b and a spring support portion 70c. The fixation portion 70a, the engaging portion 70b and the spring support portion 70c are integrated. The fixation portion 70a is fixed to the lateral surface of the front cover 41 by welding or so forth. The engaging portion 70b is shaped to protrude from the fixation portion 70a toward the dynamic vibration absorber 1, and is capable of being engaged with the circumferential ends of the coil springs 71. The spring support portion 70c supports the coil springs 71 from the inner peripheral side and the outer peripheral side.

The dynamic vibration absorber 1 is the dynamic vibration absorber shown in FIGS. 1 to 4. Additionally, the engaging portions 7b of the first plate 7 are engaged with the circumferential ends of the coil springs 71. On the other hand, the engaging portions 8b of the second plate 8 are engaged with the engaging grooves 68a of the coupling member 68.

In the torque converter 40, when the hydraulic oil is supplied to the interior of the oil chamber 65, the piston 56 is separated from the friction portion 52a of the turbine 52, and the lock-up device 43 is turned to an off state (a state in which power is not transmitted). In this state, a torque inputted to the front cover 41 is transmitted to the turbine hub 54 through the torque converter body 42, and is then transmitted to the transmission T. In other words, the power is transmitted through a path A shown in FIG. 6.

On the other hand, when the hydraulic oil residing in the interior of the oil chamber 65 is drained whereby the pressure on the front cover 41 side of the piston 56 is high, the lock-up device 43 is turned to an on state (a state in which power is transmitted). In this state, the torque inputted to the front cover 41 is inputted to the first plate 7 through the damper mechanism 44. Then, the torque inputted to the first plate 7 is transmitted to the turbine 52 through a path of "the first hub 11→the second plate 8→the coupling member 68". Furthermore, the torque is then transmitted from the turbine 52 to the transmission T through the turbine hub 54. In other words, the power is transmitted through a path B shown in FIG. 6.

When the torque is transmitted through the path B, rotational vibration attributed to fluctuation in torque is attenuated by the dynamic vibration absorber 1.

(2) Second Embodiment

Figure 7:
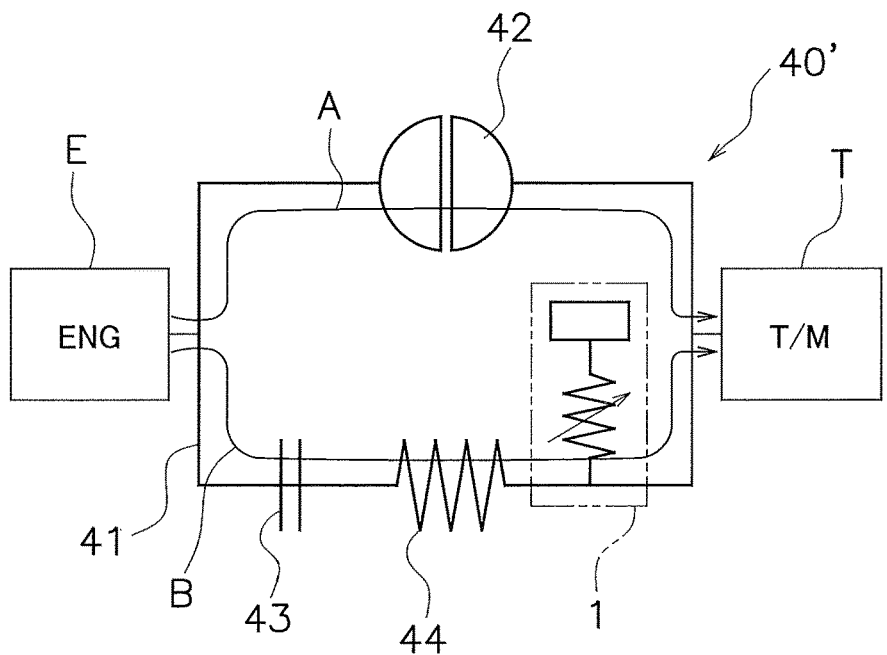
FIG. 7 is a block diagram showing a second embodiment of the dynamic vibration absorber.

FIG. 7 shows the second embodiment. The second embodiment is different from the first embodiment regarding a torque converter configuration. Specifically in a torque converter 40' in the second embodiment, the lock-up device 43 is disposed between the engine E (the front cover 41) and the damper mechanism 44. The other configurations in the second embodiment are similar to those in the application example 1.

Even in the second embodiment herein described, rotational vibration attributed to fluctuation in torque is attenuated by the dynamic vibration absorber 1 when the torque is transmitted through the path B.

Other Preferred Embodiments

The present invention is not limited to the preferred embodiment described above, and a variety of changes or modifications can be made without departing from the scope of the present invention.

(a) In the aforementioned preferred embodiment, the first and second guide plates 31 and 32 are configured to be driven by the motor 33 composed of the first and second hubs 11 and 12. However, the configuration to drive the first and second guide plates 31 and 32 is not limited to this. For example, the first and second guide plates 31 and 32 can be configured to be driven by a hydraulic system or can be configured to be driven by a motor disposed separately from the dynamic vibration absorber.

(b) The number and shape of the flat springs 4 provided as elastic members are not limited to those in the aforementioned preferred embodiment. Additionally, in the aforementioned preferred embodiment, each flat spring 4 is fixed at the inner peripheral part thereof, and is supported at the outer peripheral part thereof so as to be radially movable. However, each flat spring 4 can be fixed at the outer peripheral part thereof, and can be supported at the inner peripheral part thereof so as to be radially movable.

(c) In the aforementioned preferred embodiment, the slider pins 5 are used as sliders. However, the configurations (shape, etc.) of the sliders are not particularly limited as long as the sliders are radially movable along the elastic members.

REFERENCE SIGNS LIST

1 Dynamic vibration absorber
3 Inertia member
4 Flat spring (elastic member)
5 Slider pin
6 Drive guide mechanism
7 First plate
7a, 8a Guide groove
8 Second plate
9 Stopper mechanism
11 First hub
12 Second hub
31 First guide plate
31c, 32c Spiral groove
32 Second guide plate
33 Motor
33a Permanent magnet
33b Coil
45 Boss member
48 Battery
49 Controller

What is claimed is:
1. A dynamic vibration absorber comprising:
a rotatable first hub;
an inertia member disposed on an outer peripheral side of the first hub, the inertia member rotatable relative to the first hub;
a plurality of elastic members radially extending between the first hub and the inertia member, the plurality of elastic members elastically deformable in a rotational direction, the plurality of elastic members elastically coupling the first hub and the inertia member in the rotational direction;
a plurality of sliders radially movable along the plurality of elastic members, the plurality of sliders configured to contact the plurality of elastic members; and
a guide member radially moving the plurality of sliders, the guide member determining radial positions of the plurality of sliders.

2. The dynamic vibration absorber according to claim 1, wherein
the guide member is rotatable, and
the plurality of sliders are radially moved by rotation of the guide member.

3. The dynamic vibration absorber according to claim 1, wherein
the guide member includes a plurality of spiral grooves, and
the plurality of sliders are radially movable while supported by the plurality of spiral grooves.

4. The dynamic vibration absorber according to claim 3, wherein
the guide member includes a pair of guide plates, the pair of guide plates disposed in axial opposition to each other while the plurality of elastic members are interposed therebetween, the pair of guide plates including the plurality of spiral grooves, and
the plurality of sliders are movably supported at both axial ends thereof by the plurality of spiral grooves of the pair of guide plates.

5. The dynamic vibration absorber according to claim 1, wherein
the plurality of elastic members include a plurality of pairs of elastic members, each of the plurality of pairs of elastic members disposed in parallel with each other, and
each of the plurality of sliders is disposed between the each of the plurality of pairs of elastic members.

6. The dynamic vibration absorber according to claim 1, wherein
the plurality of elastic members each have a straight shape at least in a moving range of the plurality of sliders.

7. The dynamic vibration absorber according to claim 1, wherein
the plurality of sliders are a plurality of pins.

8. The dynamic vibration absorber according to claim 1, wherein
the plurality of elastic members are each fixed at an inner peripheral end thereof to the first hub so as to be immovable with respect thereto while each supported at an outer peripheral end thereof by the inertia member so as to be radially movable with respect thereto.

9. The dynamic vibration absorber according to claim 1, further comprising:
a second hub to which the guide member is fixed, the second hub disposed on an inner peripheral side of the first hub so as to be rotatable relative to the first hub.

10. The dynamic vibration absorber according to claim 9, wherein
the first hub includes a permanent magnet, the permanent magnet including N and S poles alternately disposed in a circumferential direction, and the second hub includes an electromagnet, the electromagnet including a coil to which electric current is supplied.

11. The dynamic vibration absorber according to claim 10, further comprising:
 a boss member disposed on the inner peripheral side of the second hub, the boss member radially supporting the second hub, wherein
 the boss member includes at least one of a controller and a battery, the controller controlling the electric current supplied to the coil of the second hub, the battery supplying the electric current to the coil of the second hub.

12. The dynamic vibration absorber according to claim 1, further comprising:
 a first plate fixed to the first hub, the first plate disposed in axial opposition to the plurality of elastic members; and
 a second plate fixed to the first hub, the second plate disposed in axial opposition to the first plate while the plurality of elastic members are interposed therebetween.

13. The dynamic vibration absorber according to claim 12, further comprising:
 a stopper mechanism configured to restrict a relative torsion angle between the inertia member and one of the first and second plates to a predetermined angular range.

14. The dynamic vibration absorber according to claim 12, wherein
 the first plate includes a plurality of first grooves radially extending and the second plate includes a plurality of second grooves radially extending, the plurality of first grooves and the plurality of second grooves provided in circumferentially identical positions, and
 the plurality of sliders are movable at both axial ends thereof along the plurality of first grooves and the plurality of second grooves.

* * * * *